Aug. 29, 1939.  C. ORSINI  2,171,095
EXTRUSION APPARATUS FOR OBTAINING LUSTER, COLOR, PATTERN, AND COMPLICATED
SHAPE EFFECTS ON ARTICLES FORMED OF PLASTIC MATERIAL
Filed Nov. 3, 1936  4 Sheets-Sheet 4

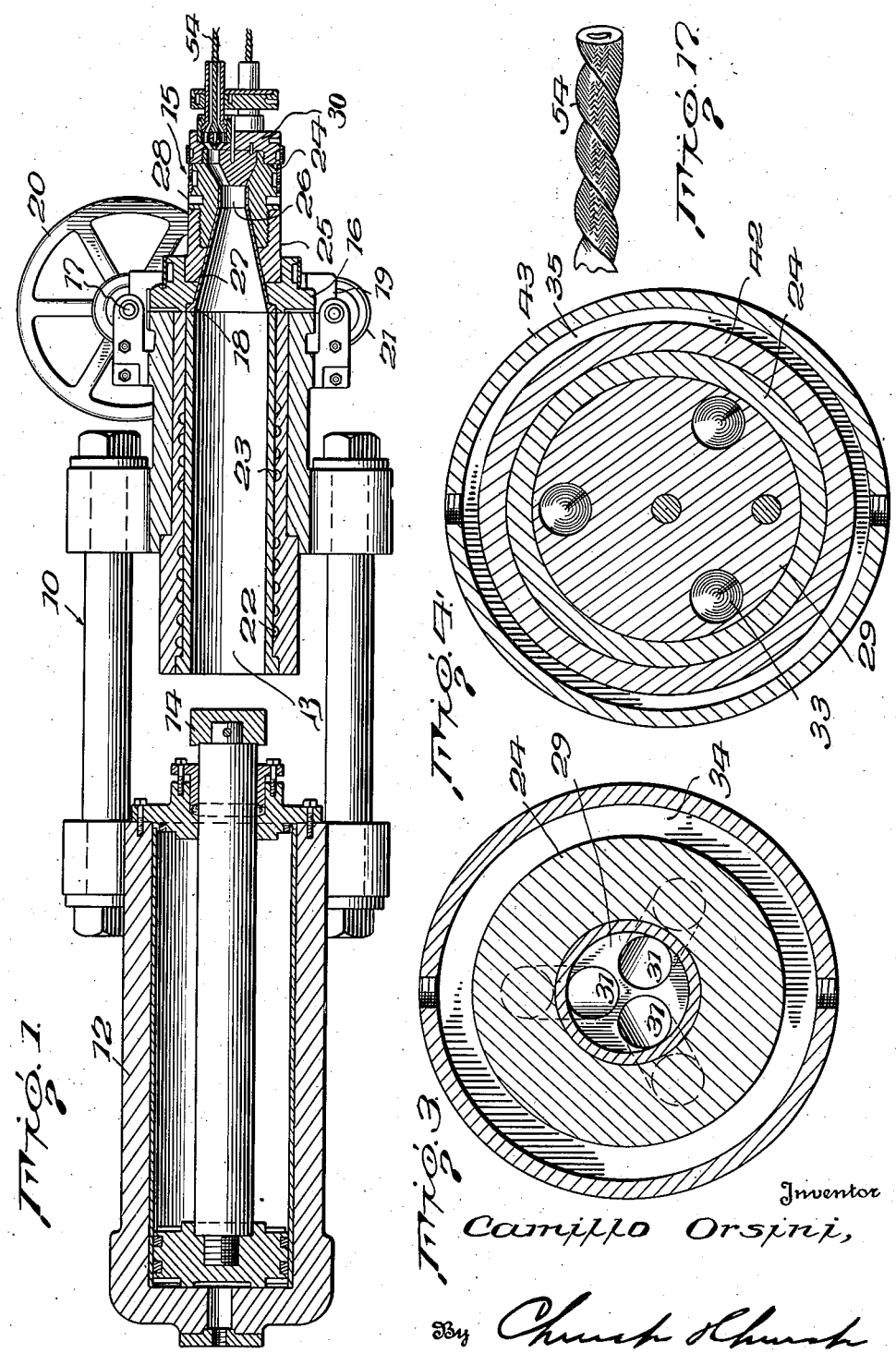

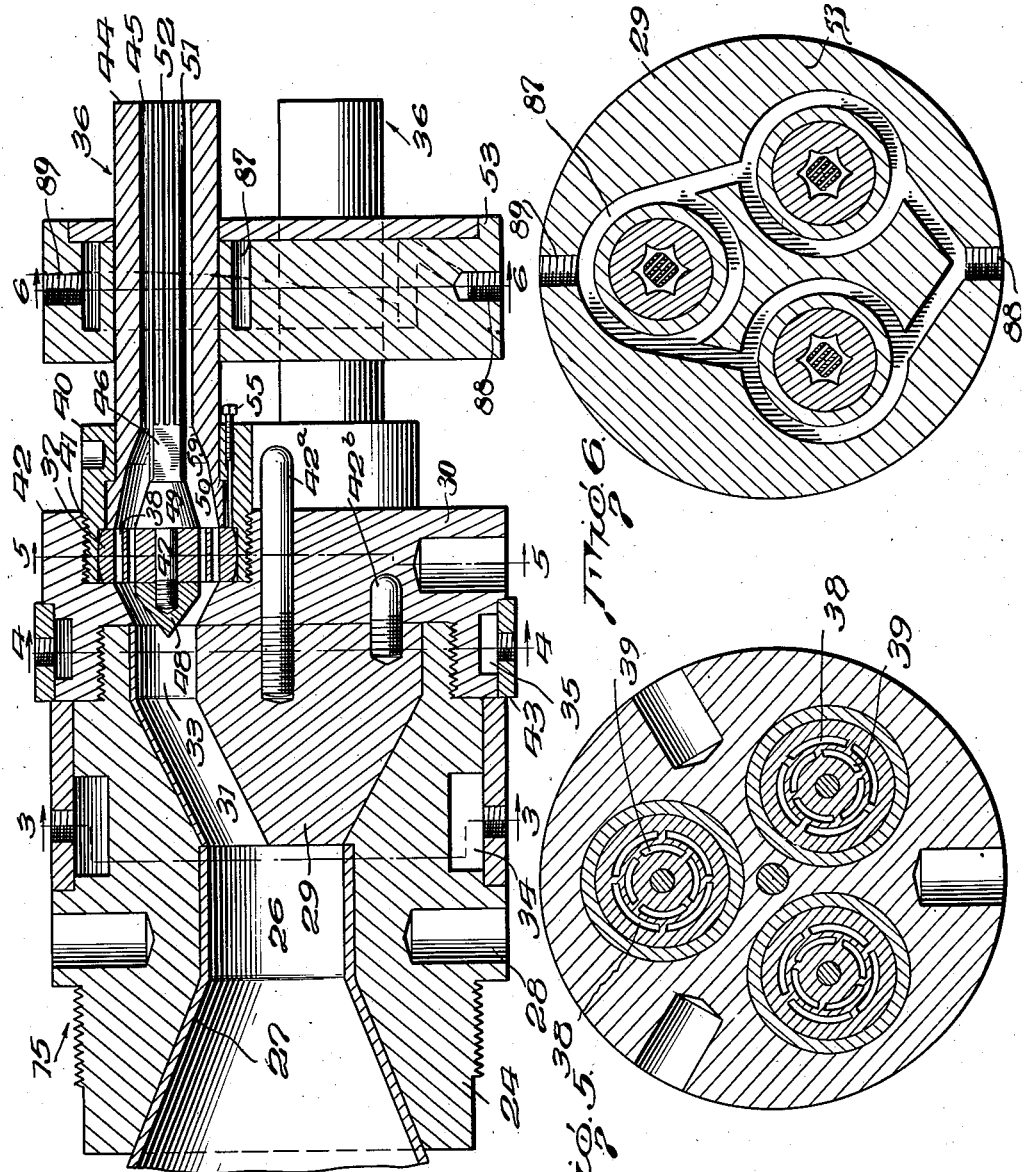

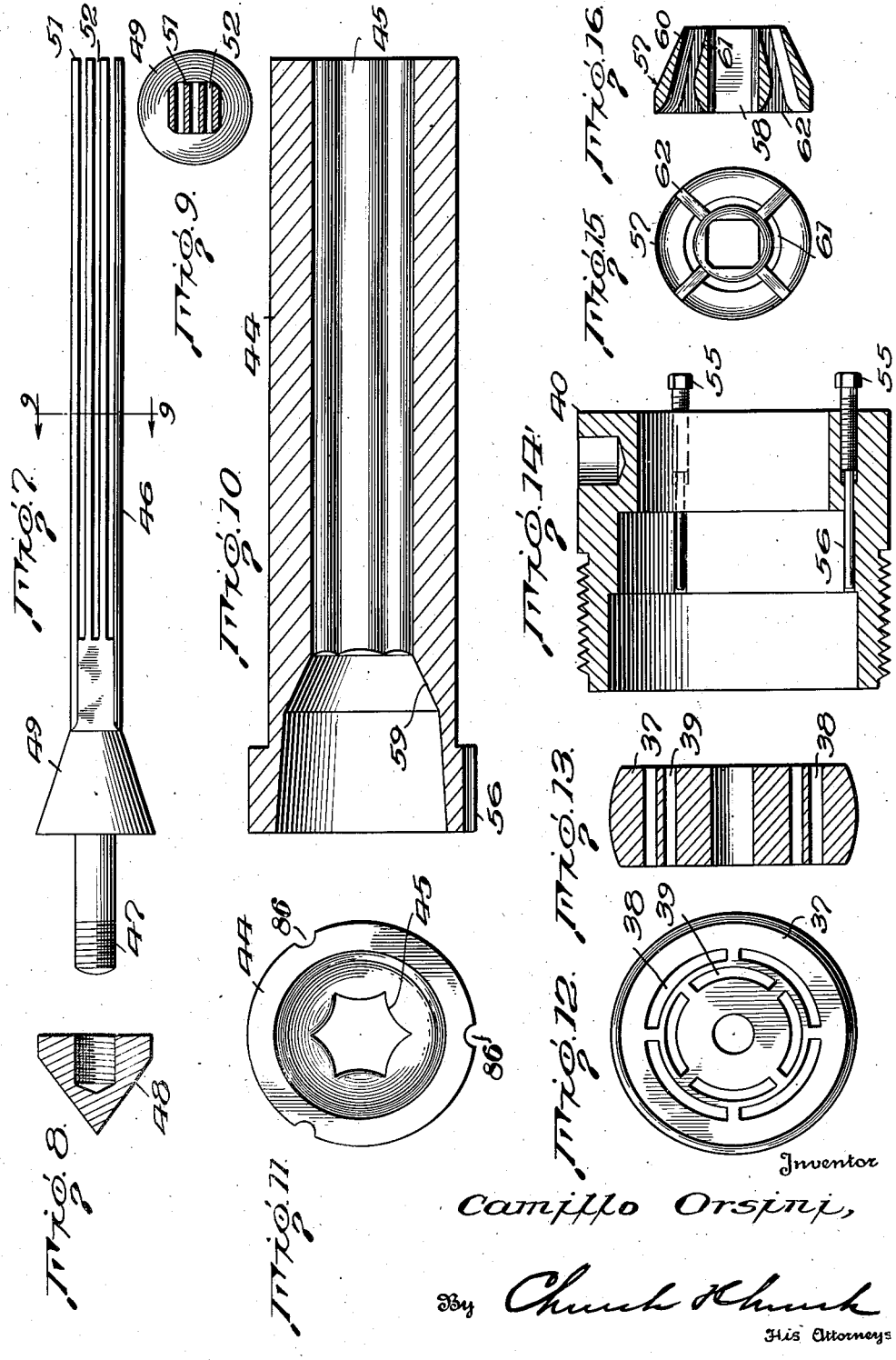

Inventor
Camillo Orsini,
By Church & Church
His Attorneys

Patented Aug. 29, 1939

2,171,095

UNITED STATES PATENT OFFICE 2,171,095

EXTRUSION APPARATUS FOR OBTAINING LUSTER, COLOR, PATTERN, AND COMPLICATED SHAPE EFFECTS ON ARTICLES FORMED OF PLASTIC MATERIAL

Camillo Orsini, Highland Park, N. J., assignor to Nixon Nitration Works, Nixon, N. J., a corporation of New Jersey Application November 3, 1936, Serial No. 109,042

5 Claims. (Cl. 18—14)

This invention relates to improvements in extrusion apparatus especially adapted to use in connection with plastics, such as pyroxylin plastics and has for its object the provision of an improved apparatus for producing, in simple fashion, novel and improved patterns, designs and color effects, and particularly continuous lustrous effects in products made of such plastic material.

Another object is the provision of an extrusion apparatus for producing novel color combinations and effects, particularly shimmering or lustrous effects of great beauty, substantially unbroken by dull or lusterless areas in plastic materials of various kinds, such as cellulose ester plastics, and preferably Celluloid.

A further object is the provision of an extrusion apparatus with which said shimmering or lustrous effects are produced by lustrous areas formed internally of the plastic body.

A still further object is to provide an improved apparatus whereby variously shaped rods of indefinite length can be produced by continuous extrusion.

Another object is to provide an apparatus wherein products possessing the foregoing characteristics can be produced in considerably less time, and with less labor than has heretofore been required.

With these and other objects in view, the invention consists in certain details of construction and combinations and arrangements of parts, all as will hereinafter be more fully described and the novel features thereof particularly pointed out in the appended claims.

In the accompanying drawings—

Figure 1 is a side elevational view of an extrusion apparatus having an extrusion head in which certain features of the present invention have been embodied, this portion of the apparatus being shown in longitudinal, vertical section;

Fig. 2 is a detail view in longitudinal section on a somewhat larger scale, but taken on the same vertical plane as Fig. 1, and illustrating the extrusion head and nozzle;

Figure 20:
Figure 21:
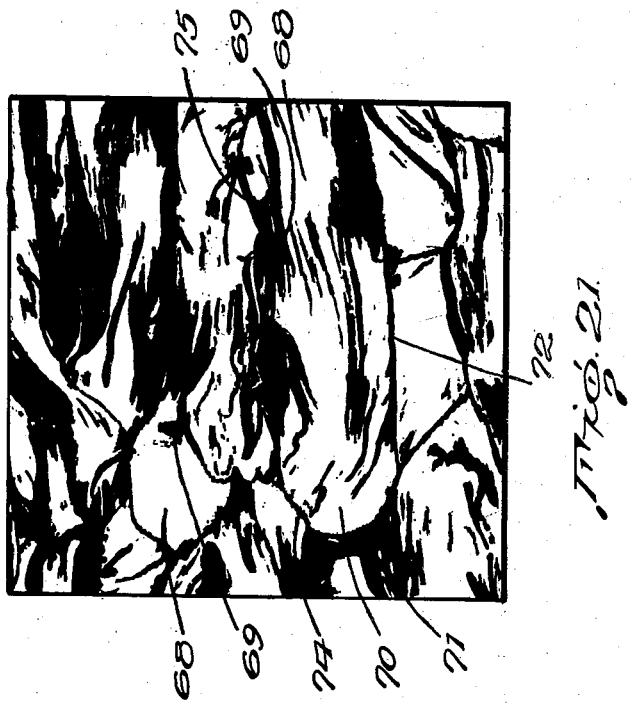
Figure 18:
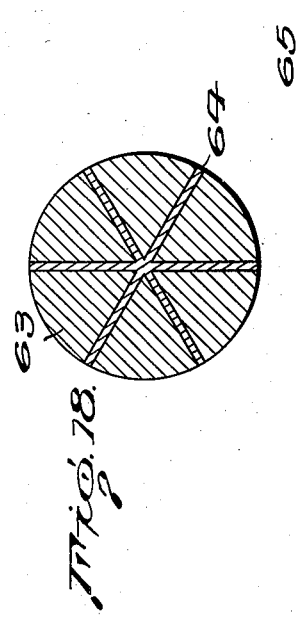
Figure 19:
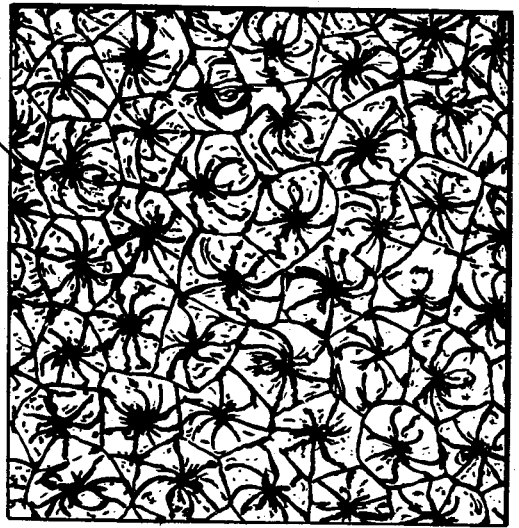

Figs. 3, 4, 5 and 6 are transverse sections on the lines 3—3, 4—4, 5—5 and 6—6, respectively, of Fig. 2;

Fig. 7 is a detail view in longitudinal elevation, upon a still larger scale, of the mandrel shown in Fig. 2;

Fig. 8 is a view, in section, of a cooperating part of said mandrel;

Fig. 9 is a transverse section on the line 9—9 of Fig. 7;

Fig. 10 is a view in longitudinal section of the extrusion nozzle which, in Fig. 2, surrounds the parts illustrated in Fig. 7;

Fig. 11 is a view in end elevation of the nozzle of Fig. 10, looking from left to right;

Fig. 12 is an end elevation of a cutter member or so-called "breaker" which also serves as a support for the elements illustrated in Figs. 7 and 8;

Fig. 13 is a transverse vertical section of the cutter member or breaker illustrated in Fig. 12;

Fig. 14 is a view similar to Fig. 13, of a socket member which serves to support the cutter member or breaker illustrated in Figs. 12 and 13;

Fig. 15 illustrates a spider structure which is to be used as a second support for the mandrel when the latter is not to be adjustable;

Fig. 16 is a transverse vertical section on the line 16—16 of Fig. 15;

Fig. 17 is a view, in side elevation, upon an enlarged scale, of a portion of the product as extruded from the nozzle of the machine;

Fig. 18 is a transverse cross-section of a cylinder of plastic material formed in the "pearl box" after it has been cut and provided with "veins" of contrasting color;

Fig. 19 illustrates the pattern of a sheet obtained by treatment of the veined cylinder of Fig. 18 in accordance with the present invention;

Fig. 20 illustrates, in side elevation, a portion of a twisted two-colored rod having numerous internal bands or zones of luster running in more or less parallel fashion at least in groups and produced on the present extrusion machine; and Fig. 21 shows a sheet produced from rods such as illustrated in Fig. 20 and illustrating the practically continuous nature of the surface.

In accordance with the present invention, multi-colored effects can be obtained in simple fashion in the following manner: A cylinder or block of plastic material is cut into any desired number of segments and one or more of such segments are replaced with segments of different color or shade. The composite cylinder or block thus formed is then charged into the present extrusion machine from which it emerges as a straight, or as a twisted, tube, rod or bar. The tube, rod or bar so obtained is then cut into convenient lengths and laid side by side in one or more layers in a suitable form or chase and pressed into a solid block which, upon being sheeted parallel to the axes of the rods, produces sheets having multi-colored patterns composed of pleasing twists or curves. Where the pressed block of rod lengths is cut perpendicularly to the axes of the rod lengths, beautifully formed spiral effects are obtained. More intricate and spider-like spirals and veinings can be obtained by placing sheets of dark-colored plastic between adjacent segments of the cylinder, so that the resulting twisted rods, when cut perpendicular to their axes, yield unitary designs having component elements consisting of spiral veinings, the veins emerging from a common point if the dark-colored vein sheets extend to the center of the cylinder.

The present application is based upon the apparatus disclosed in applicant's copending case, Serial No. 35,698, filed August 12, 1935, which has been restricted to the process and product, the present case being devoted to the apparatus. However, to better appreciate the advantages of the present apparatus, a word might be said regarding prior processes and the process for which the present machine has been designed. For instance, in the processes heretofore in use for producing lustrous sheets of Celluloid for the manufacture of fountain pen barrels, knife handles, etc., the following steps have generally been followed:

(1) Mixing of the pyroxylin and plasticizer (or other plastic), the luster-producing material, such as bronze powder, and the solvent;
(2) Filtering;
(3) Forming solid cylinders of such plastic in a "pearl box" or mold;
(4) Extruding the plastic through a die to obtain a hollow cylinder;
(5) Cutting of the cylinder to produce a sheet;
(6) Drying;
(7) Pressing of the sheet in a chase;
(8) Sheeting—that is, cutting the pressed sheet into thinner sheets;
(9) Repressing;
(10) Sheeting;
(11) Dicing—that is, cutting the sheet into small cubes;
(12) Pressing a mass of the dice or cubes to weld the mass into a solid block which is generally about 5½" thick;
(13) Cutting the mass into sheets of the desired size.

In the known process just described, the lustrous surfaces are produced during the extrusion of the tube of plastic, the cutting of the hollow cylinder, so obtained, producing a sheet having a lustrous surface only upon the opposite sides thereof. In the subsequent dicing, the lustrous surfaces are retained but their quantity or area is not increased, and the dice have luster only upon two opposite sides thereof, with the four remaining sides being lusterless. Upon compression of the dice into a solid block and subsequent sheeting of such block, the sheets of plastic material thus obtained have angular (generally square) patches of relatively high luster surrounded by relatively large areas of no luster.

With the present apparatus, however, the process is greatly simplified, a number of the steps above outlined being omitted, so that the total time of operation is reduced from about 54 hrs. to about 27½ hrs. for a batch of 400 lbs., that is, from the mixing to the final sheeting, when only one extrusion die is employed in the machine; and to about 21½ hours when the machine is equipped with three extrusion dies. In addition, the process practised with the present machine involves less pressing, thus reducing the amount of power required and producing less scrap material. Also, lustrous effects can be easily obtained with two or more colors and the lustrous surfaces are continuous to a much greater extent than in the case of the previous processes, where the dice are compressed into a block which is subsequently sheeted. With the present apparatus, the process comprises the following steps:

(1) Mixing of the pyroxylin and plasticizer, the luster-producing material, such as bronze powder, and the solvent;
(2) Filtering;
(3) Forming a cylinder, for example, 10" in diameter and 45" long, in a suitable mold;
(4) Cutting the cylinder into as many segments as desired, and replacing one or more segments with a segment of a different color. As the final product is to be veined, a sheet of black pyroxylin plastic, or of any other suitable material is interposed between the adjacent segments. These operations require an additional hour, but are, of course, performed only when the product is to be multi-colored or veined;
(5) Extruding the plastic. The extruding nozzle is of novel construction, as will be more fully described hereinafter, and operates to cut the mass of plastic into a plurality of ribbons, in such manner that each ribbon is given a lustrous surface on all sides thereof, after which the ribbons are forced together again and extruded in the form of a tube, rod or bar;
(6) Cutting the extruded rod into pieces of suitable length;
(7) Pressing the pieces of plastic after arranging them according to any desired pattern; and
(8) Cutting the pressed plastic into sheets of the desired thickness.

In the embodiment of the invention selected for illustration, the reference character 10 designates generally an extrusion press of the horizontal type, whose general construction is well known, the fluid pressure cylinder 12, charge receiving cylinder 13 with the ram 14 which is actuated by the fluid pressure cylinder and piston and acts to advance the charge into cylinder 13, all being instrumentalities which may be, and are herein shown as, of known form, combined and cooperating in the usual manner. The extrusion head 15, in its general structure, is also of a well-known type, in so far as it includes a member 16 of annular shape formed separately from the cylinder 13, but hinged thereto as at 17, upon a horizontal axis about which the extrusion head as a whole is adapted to swing clear of the mouth of the cylinder so that the latter can be charged from its forward end, after which the head is swung back into the position shown in Fig. 1. The point 18 is preferably sealed, with a suitable gasket or packing, as indicated, and a clamp 19 holds the member 16 firmly seated against the cylinder 13. Hand wheels 20 and 21 are preferably provided for the react manipulation of the head 15 and clamp 19, respectively. Jackets 22, 23, of usual form, for the circulation of a heat exchange medium, may be, and preferably are, provided where necessary, as will be understood by those skilled in the art.

In the apparatus illustrated, the extrusion head comprises an intermediate member 24 supported from the annular member 16 by a sleeve 25 welded or otherwise secured to the member 16, the intermediate member 24 being screw-threaded on sleeve 25 whereby the same may be readily removed for repair or replacement. The parts 16, 25 and 24 provide a continuous conduit for the plastic material forced into the extrusion head from the cylinder 13 by the cylinder ram 14. As will be noted, the internal diameter of this conduit is of gradually decreasing cross-section until approximately the middle of member 24, at which point there is formed a throat 26. The inner surface of the conduit may be provided, if desired, with a non-corrodible lining, as indicated at 27, and member 24 may be provided with recesses 28 to receive a suitable tool for mounting or demounting said member and the parts connected therewith. The discharge end of member 24 is tapered outwardly and receives a similarly tapered divider block 29 held in place by a plate 30 which is detachably connected to the member 24. The purpose of the divider block is to distribute the mass of plastic material into as many streams as the machine has nozzles, the machine illustrated in the present instance having three nozzles. Accordingly, the divider block is formed with three diverging ducts 31, each of which leads into an extrusion nozzle detachably mounted on the plate 30. The total cross-sectional area of the ducts 31 is not substantially greater than that of the throat section 26 of member 24. In fact, it is preferably slightly less. Of course, if the machine is to be used with only one nozzle, the outlets of two of the ducts 31, in a machine of the present type, would be closed with a suitable plug, or the divider block 29 might be replaced by a block having only one duct, or the member 24 could be formed with a single discharge duct. The ducts 31 are symmetrically disposed with respect to the longitudinal axis of the press and, while they are all closely adjacent to one another at the region of exit from the throat portion 26, they diverge radially toward the periphery of divider block 29, at their forward openings (Figs. 2, 3 and 4), and have substantially horizontal or axially parallel portions at their outlet regions, as indicated at 33 (Fig. 2). A heating medium circulating through jackets 34, 35, maintains the material in a plastic condition as it passes through the member 24 and divider block 29.

The extrusion nozzles are designated generally by the reference character 36 and one suitable form of such a nozzle is shown on a comparatively large scale in the detail sectional view of Fig. 2. As previously indicated, the present invention, in its preferred form, contemplates a treatment of the plastic material which will produce a multiplicity of lustrous areas internally of the extruded material as well as producing such lustrous areas at the exterior of the extruded material. In pursuance of this object of the invention, each stream of plastic material passing into one of the ducts 31 and through the extrusion nozzle is subjected to repeated cutting or dividing operations whereby it is subdivided into a plurality of longitudinally extending sections or ribbon-like increments, which are subsequently rewelded into a composite mass as the material emerges in the form of a rod, stick or tube, from the mouth of the extrusion nozzle. In the example illustrated, all the nozzles 36 may be of the same structural type, although it is not essential that the several nozzles be identical in construction inasmuch as it may be found convenient for securing complexity and added diversity of product to employ nozzles of different structure so that the several nozzles of the machine will each turn out a distinctive component to be employed for, or combined in, the final product. The expression "nozzle", as used herein, may be regarded as designating an entire unit or instrumentality for treating the advancing supply after it leaves orifice 33 of the divider block 29 and each nozzle is designed to effect various phases of material subdivision, contributing to the final effect intended to be produced, so that there may be considerable variation in the number, relative arrangement, and cooperation of the parts of the nozzle used in bringing about such subdivisions. The interior construction of the nozzle is such as to produce a large number of lustrous bands within the interior of the extruded material. These bands are formed by causing the particles of the luster-producing material to be orientated in planes in such fashion as to cause their light-reflecting surfaces to be arranged in parallelism, as is well understood in the art. In the nozzle for accomplishing this result, there may be included at its base a member 37 which, for convenience, is referred to as a spider, breaker or initial ribboner and while this member is shown as of annular form, it may, of course, be of any other suitable shape. This so-called spider operates to subdivide the stream of plastic material into a plurality of increments or ribbons. The extent to which the mass is thus subdivided is apparent from an inspection of Fig. 5 which shows the spider as composed of two series of arcuate channels 38, 39 formed concentric with respect to the longitudinal axis of the spider and preferably staggered circumferentially thereof. The walls of these channels are preferably very smooth and the channels should be of such axial length that the plastic material is formed into a plurality of straight ribbons therein, the surfaces of the ribbons being thus given a certain degree of luster by reason of their effecting the orientation of the luster-producing particles, as previously mentioned.

To retain the spider in its proper position, a coupling member 40 is screwed into a suitable socket portion 41 of a plate 42, the latter being supported from the reduced threaded end of member 24. Plate 42 contains the heating jacket 35 previously described, the annular space being closed by a cover 43. The coupling member 40 is provided with a shoulder bearing against the spider ring 37 and holds the latter snugly against its seat within the member 42. Also, by reason of a suitably formed shoulder, member 40 serves to hold, in assembled relation with the spider, a bushing 44 forming the casing of the nozzle, said casing having an axial bore 45 into which the plastic flows subsequent to having passed through the arcuate channels 38, 39, of the spider. It is in this bore 45 of the bushing 44 that certain operations are performed upon small streams of the plastic, which operations play an important part in the properties and final configuration of the extruded body of plastic emerging from the exit of each nozzle.

Positioned within the bushing 4 is a mandrel 46, preferably supported in cantilever fashion from spider 37. For this purpose, the hub of the spider is provided with a bore through which extends a threaded post 47 engaged by a nut 48 on the opposite side of the spider, thus clamping the mandrel to the spider. Preferably, said nut is of conical shape, so that it serves as a means in diverting the stream of material from the duct 33 outwardly toward the series of arcuate channels 38, 39. Bore 45 of the nozzle is uniform for a considerable distance inwardly of its discharge end, but toward its inner end it gradually increases in diameter until it becomes substantially equal to the outer diameter of the outer arcuate channels 38. Likewise, the inner end of the mandrel is so shaped as by being tapered, as indicated at 49, that it cooperates with the wall at the inner, enlarged bore of bushing 44 to provide an annular channel 50 of limited and, preferably, decreasing cross-section, for reasons which will appear hereinafter.

In accordance with the present invention, mandrel 46 is also so formed or constructed that, as the plastic is forced through the bushing 44, the particles of luster-producing material will be acted upon to form a large number of internal lustrous planes which remain as definite zones of luster and brilliance, notwithstanding the fact that the material is subsequently welded into a compact mass. In other words, by dividing the mass of plastic material into a large number of sections or ribbons, and passing these ribbons under pressure over smooth, preferably metallic, surfaces, the innumerable particles of the bronze powder or other similar material suspended in the plastic are alined or orientated in parallelism with their brilliant luster surfaces facing outwardly. When these ribbons are again forced together into a composite mass, as in the form of a solid rod or block or the like, these lustrous areas are not destroyed and, when the material is cut along or near such areas, the luster appears even through the mass of overlying, more or less transparent, plastic, with its original brightness or with various shades or nuances depending upon the angle of the cut and the angle or curvature of the lustrous surface, thus giving a shimmering three-dimensional effect, comparable to that of fabrics having "changeable" colors. In other words, the mandrel acts upon the luster-producing particles in the same manner as the surfaces of the openings in the so-called spider 37. Therefore, in accordance with the present invention, that portion of mandrel 46 lying within the uniform bore of bushing 44 is formed with a plurality of forks or tongues 51, in the present instance four in number, as clearly shown in Figs. 2, 7 and 9, to produce a number of slots or recesses longitudinally of the mandrel itself. As a consequence, the plastic material as it passes through the bushing 44 is caused to again be subdivided by being forced into the slots in the mandrel, so that as it passes over the smooth surfaces formed by the slots, the particles of luster-producing material will be orientated, as previously described. In this connection, it will be noted that the cross-sectional area of the space 53 through which the plastic passes from the spider 37 to the slotted portion of the mandrel is of gradually decreasing cross-section due, primarily, to the converging bore of bushing 44, so that as the so-called ribbons of material emerge from the slots 38, 39 of spider 37, said ribbons will be forced together and united in a substantially unitary mass. However, due to this tapering of the bore of bushing 44, there will be a tendency of the ribbons to curl inwardly, so that, as they enter the mass being formed in the passage 50, the bands or areas of luster produced by the ironing action of spider 37 will be displaced, as distinguished from extending in continuous, parallel planes. In other words, the band of luster formed by the walls of a slot in spider 37 will not remain a straight, unbroken band but, due to the curling action in the space 50, the band will be offset at portions of its length, so to speak, whereby wavy lines of luster will be formed in the mass as the ribbons are reunited within the passage 50. This action takes place, as will be understood, before the mass formed of the reunited ribbons enters the more restricted portion of the bushing 44 and the slots in member 46. To maintain a high degree of pressure within the bore 45 of the bushing, the cross-section of such bore may be reduced in area as by giving it a star-shaped cross-section having six apices between which the walls are convexed inwardly, as illustrated in Figs. 6, 10 and 11. The available flow area, therefore, between the external surface of the mandrel and the inner walls of bore 45 is considerably less than the cross-section of the annular passage 50, so that the material is compelled to flow into the narrow passageways 52 formed by the tongues 51 in the mandrel. The plastic is thus cut or subdivided within the nozzle into a number of strips or ribbons, the opposite faces of each of which glides under pressure against smooth metallic surfaces on the tongues 51, whereby luster-producing particles at such surfaces are alined in flat, parallel relationship, thus producing surfaces of high luster which, of course, will be at the interior of the mass as it emerges from the bushing. Also, the action of the tongues of the mandrel on the luster-producing particles in the plastic will not interfere to a very great extent with numerous other particles which have been acted upon and orientated by passage through the slots of spider 37.

The several ribbons of material issuing from the nozzle 36 may be drawn off in straight condition, the lustrous surfaces produced in the mandrel and bushing being thus maintained flat and more or less parallel to one another while, of course, there will be other wavy lines of luster which have previously been produced by passage through the slots in spider 37. In certain instances, this maintenance of parallelism of some of the luster surfaces might be desirable, but it is preferred to twist the several ribbons as they emerge from the nozzle, so that a twisted length of plastic is obtained in which the lustrous surfaces extend helically, as illustrated in Fig. 17, wherein there is shown a twisted rod 54 of plastic composed of a plurality of ribbons which have been welded together by twisting.

While the twisting above referred to may be done manually, means are provided in the present machine whereby this twist is automatically imparted to the ribbons or mass of plastic emerging from a nozzle. This is accomplished by positioning the mandrel eccentrically with respect to the axis of the bushing 44, so that the pressure and flow conditions within the nozzle are unbalanced to such an extent that the plastic emerges in a length having a definite twist. To effect adjustment of the mandrel within the bushing, there are provided a number of screws 55, three being sufficient, as shown best in Fig. 14, said screws being threaded into tapped holes in the coupling member 40 and provided with extensions 56 which bear against the outer portion of the spider 37. By properly adjusting screws 55, the axis of the spider can be tilted, within certain limits, with respect to the axis of bushing 44 and as mandrel 46 is rigidly mounted upon the spider, it follows that the mandrel will be displaced together with the spider. To facilitate this adjustment of the spider, the outer surface thereof can be rounded off to a certain degree, as illustrated in Fig. 13. The inner end of bushing 44 may be provided with notches 86 where necessary, as shown in Fig. 11, to accommodate the extensions 56 of screws 55. Where, however, the mandrel is to be kept permanently in coaxial relation with bushing 44, it may be additionally supported by means of a second spider 57 (see Figs. 15 and 16), which is provided with a central opening 58, through which the mandrel extends. This second spider 57 has a tapered outer surface adapted to be positioned against a tapered portion 59 of the bore 45. The spider 57 is composed of an outer ring 60 and an inner ring 61 held together by spokes or partitions 62. The plastic material flowing through the annular passage 50 will be cut into four sections by the spokes 62 of the spider 57, but the material then becomes at least partially welded together before it enters the passageways 52 of the mandrel. It will also be noted that the passageways through the spider 57 are of gradually diminishing cross-section.

As shown in Fig. 6, in the machine illustrated there are three nozzles, and these nozzles may be assembled within a circular plate 53 provided with heating jackets 87 around each of the nozzles, the jackets being connected, as shown, and supplied with hot water or steam which enters at 88 and discharges at 89.

In the use of the present machine, as applied to the manufacture of sheets of plastic material having lustrous areas within the interior thereof, which can be seen through the more or less transparent material, such lustrous areas running at various angles to the surface of the sheet and thereby producing lustrous and shimmering effects and different tones and intensities throughout the greater portion of the sheet, a mass of plastic material having suspended therein a substance capable of producing luster such as a bronze powder, is shaped into a block of suitable size in a mold and then, upon release of the extrusion head by a loosening of the clamp 19, said block is inserted into the cylinder 13 from the front thereof. The block of material can, of course, also be inserted from the rear of the cylinder as may be desired. Also, as previously suggested, the block may be composed of a number of different colors of material by removing segments of one block and replacing the same with segments of a second block of different color. Upon clamping of the extrusion head on the cylinder 13, fluid pressure is introduced into the pressure cylinder 12 placing the plastic in the cylinder 13 under pressure. By virtue of the gradually decreasing internal cross-section of the parts 16 and 24, the material is maintained continuously under high pressure, and as it passes through the divider mechanism 37 it is subdivided into two circular series of ribbons and, as the same glide over the more or less smooth metallic surfaces defining the slots 38 and 39, the bronze powder particles are, to a certain extent, alined at those surfaces, thereby producing areas of luster. These ribbons are welded together again within the space 50, but due to the fact that this space 50 is of gradually reduced cross-section as it approaches the entrance to bushing 44, the lustrous areas are not maintained in their original more or less straight and parallel relationship, but are caused to curl or become offset, so to speak. This curling action imparted to the ribbons as they are being welded together in space 50 causes the lustrous areas previously produced to be disposed more or less promiscuously throughout the mass. That is, the luster-producing particles which, at that point, had been orientated by the action of the opposed surfaces of slots 38 and 39 will not retain their original relationship and remain straight, but will be displaced or offset at various points or portions so as to produce comparatively small areas of luster disposed promiscuously throughout the mass. The so-welded mass then passes into the region of the bushing 44 within which there is housed the longitudinally slotted portion of mandrel 46 and, as the total free-flow cross-sectional area within this portion of the bushing is not substantially greater but, in fact, is preferably less, than the flow area within the space 50, the plastic is forced into the slots 52. Within these slots the plastic is forced under pressure for a considerable distance over or between the relatively long opposed smooth, hard surfaces thereof, so that there is imparted to the individual increments between each pair of opposed surfaces highly lustrous surfaces along planes which, at least for the most part, are different from the planes of cleavage which were formed at the divider 37. By thus passing the material through the bushing, there are formed a large number of lustrous surfaces by the divider 37 and, subsequently, other surfaces by the mandrel 46, the various surfaces differing in degrees of intensity. As the material emerges from the mouth of the nozzle, it may be permitted to collapse into a more or less flat rod, or it may be twisted manually but, as previously explained, in the preferred form of apparatus the mandrel 46 is positioned eccentrically with respect to the bushing to automaticaly effect a twisting of the extruded length of material. The position of such twist is regulable to a certain extent by varying the degree of eccentricity of the mandrel. In this way, a twisted rod 54, such as illustrated in Fig. 17, whose outer surfaces are lustrous and which contains internal bands of luster which can be easily seen by cutting the length of the material longitudinally, such bands of luster being continuous and the different angles at which they lie to the cut surface producing pleasing shades and tones of luster which are visible through the transparent or semi-transparent plastic material.

If desired, as for instance in producing highly lustrous sheets suitable for manufacture of fountain pen barrels, knife handles and other ornamental ware, the length of material 54 can be cut into sections of suitable length, say 2 to 4 inches, and the sections then arranged in a suitable press-box in parallel superimposed relationship, the mass of sections of material then being pressed into a solid block in a manner well known in the art and, upon sheeting of the compressed block along planes parallel to the axis of the original lengths of the material, sheets are obtained which show lustrous areas of different intensities for the greater part of the surface of the sheet; in fact, for as much as 70% to 80% or more of the total area. To a certain extent this sheet will show spiral convolutions corresponding to the convolutions of the original length of material extruded from the apparatus. However, by arranging the lengths of material in different ways, different composite effects can be produced as, for instance, by cutting a sheet from the block at an angle to the axis of the original sections of material. For example, if cut at right angles, a lustrous "rose-bud" pattern will be obtained consisting of streaks of luster issuing more or less spirally from a central point and surrounded by more or less non-lustrous areas.

The cutting of a pressed block at right angles to and parallel to the axes of the component twisted rods, is illustrated in Figs. 19 to 21. Fig. 19 shows a sheet having a novel spider-like pattern which is produced from extruded rods whose original block of plastic material was provided with "vein" sheets. Such a block is shown at 63 in Fig. 18. The cylindrical block has been cut into six segments and between each pair of adjacent segments there has been inserted a plastic vein sheet of contrasting shade or color. This block is then fed into the extrusion press shown in Fig. 1 except that the eccentrically positioned mandrel is not square and slotted as shown, but is more or less cylindrical. There is thus obtained an extruded rod of reduced diameter which upon being cut, grouped in a press-box, pressed, and sheeted at right angles to the axes of the rods yields a sheet having a pattern similar to that shown in Fig. 19. The sheet shown in this figure was made from a veined block of plastic similar to that shown in Fig. 18 but having eight vein sheets. By positioning the mandrel eccentrically, the veins are given a somewhat spiral twist as shown at 65. The distortion of the veins is due to the mandrel and the irregularity of the design yields a novel and pleasing effect. It may be mentioned that the plastic material employed for making the sheet of Fig. 19 need not have any bronze powder or similar material suspended therein where the desired result is not so much an increased luster as a diversity of design; streaks or lines of luster may, however, form part of the design.

Very beautiful color and luster effects can be obtained by making the original block of plastic material of parts of different color. Thus Fig. 20 shows an extruded twisted rod made from a cylinder or cartridge composed of segments of, for example, purplish and greenish tints. The extruded rod shows spiral bands of purple 66 merging into spiral bands of green 67, the surfaces being lustrous and the interior of the rod having numerous planes of luster. Fig. 21 shows a sheet cut from a pressed block of twisted rod similar to that shown in Fig. 20. This sheet has green zones of very high luster, as shown, for example, at 68, merging into zones of lower luster 69 in such a manner as to give an impression of colors of different shades, the luster varying as the sheet is held at different inclinations to the light as lustrous areas of different inclination are made reflecting. In similar fashion the purplish areas 70 of high luster run into areas 71 of lower luster, the relative luster, however, varying as the inclination of the sheet is varied. The effect is very similar to that of mother-of-pearl which reveals different areas of luster as it is moved about in the hand. The lines 72 show the areas of separation between adjacent plastic rods of which the block from which the sheet was cut was composed. As will be seen from the portion 73 defined by the bounding lines 72, 74 and 75 the lustrous zones corresponding to each original rod extend for considerable areas, as much as four and more inches depending upon the size to which the extruded rod was cut. The portion 73 in the present instance is not of one color, but, as it was formed from the rod shown in Fig. 20, shows greenish areas blending gradually into purple areas in a very pleasing fashion. It will readily be seen that by employing rods of different sizes and colors and by arranging them in different ways, various pattern and color effects, combined with a high degree of "pearl" or luster may be obtained. These color shadings and nuances cannot, of course, be shown on the drawings.

An interesting property of the sheet of Fig. 21 and similar sheets produced in accordance with the invention is that the rather small dull areas which are shown in solid black upon the drawings are for the most part dull only when the sheet is held in a certain position. When the angle of the sheet is changed, new planes of luster within such dull areas are brought into reflecting condition and such hitherto dull areas become areas of high or intermediate luster. The sheet may thus be said to have lustrous zones over practically its entire extent.

Very curious and interesting effects may be obtained by the eccentric positioning of the mandrel. Where both the bushing and the mandrel are round and eccentric with respect to each other, an extruded tube is obtained which is of non-uniform cross-section, that is, its internal and external peripheries are eccentric with reference to each other. If the end of this tube is pinched to close it and the tube is then caused to pass downwardly over an approximately right-angled bend and then drawn off horizontally, it collapses with a repeated "gasping" action as the internal support of the air is removed and the atmospheric pressure acts thereon, the collapsed tube taking the form of a rod having under-cut ridges of V-form at one side thereof. These ridges are inclined to varying extents to the longitudinal center of the rod; that is, the apices of the V-ridges are positioned alternately upon opposite sides of such center. The apices of the successive ridges are connected between the ridges by webs running to the bottom of the rod. The ridges of the rod are formed of the thicker portions of the extruded tube while the bottom of the rod is made up of the collapsed thinner portions of the tube, the whole rod being formed of collapsed or doubled tube walls.

Twisted extruded rods of different shapes may be obtained by utilizing nozzles wherein the internal bore of the bushing is of different shape from that of the mandrel, the mandrel being solid. Thus, the bore of the bushing may be square, circular, fluted and circular, fluted and square, or have any other polygonal shape, while the mandrel may be round, square, or of any other shape, various combinations of these shapes producing continuous extruded rods of different form and cross-section, particularly when the mandrel is eccentrically positioned. In this way, spirally shaped rods having sharp or rounded spiral ridges, flutings, etc. and combinations of these design elements can be obtained.

How much greater is the amount of lustrous areas obtainable by the process of the present invention as compared with prior processes will readily be seen from the following example. Assuming that a bushing having a bore in the shape of a six-pointed star is employed in association with a solid, square or round mandrel, there is obtained an extruded tube which is lustrous along all the surfaces between the points of the star. These tubes are collapsed into a flat strip which may be about ¼ of an inch thick and about 1¼ and 1½ inches wide. These strips are cut into any desired lengths, and then placed in a chase, compressed and later cut into sheets. The much greater lustrous area contained in a compressed mass of plastic material made up of these flattened tubes as compared with the old dicing method will be evident when it is considered that when these flattened strips are cut into, say, three-inch lengths, each strip is lustrous on all of its surfaces except the two narrow cut end surfaces whose area is only about ¼ inch by about 1¼ inches, whereas both faces of the strip, each of which is at least 1¼ by 3 inches are lustrous. To this should be added the longitudinal ends which are likewise lustrous; moreover, the surface on the top and bottom faces is not flat but undulating, thereby presenting an even greater lustrous area. To these lustrous areas should be added the internal zones or areas of luster which are revealed by the knife. In the case of the dicing heretofore practiced, the dice, which were cubes of about ¼ to ½ inch on a side, presented two lustrous surfaces and four non-lustrous surfaces, the non-lustrous area being thus twice as large as the lustrous area, whereas in accordance with the present invention the lustrous area of the pieces of plastic which are to make up the block from which the final sheets are cut, far exceeds the non-lustrous area and, moreover, is continuous for much greater areas than heretofore.

As can be seen from Figs. 20 and 21, which show an extruded rod and a patterned lustrous sheet drawn to full size, the lustrous areas have considerable width, being as much as ½ to ¾ inch wide and even more at numerous places. Were sheet 21 produced from rods of the size of that shown in Fig. 20 but having luster only upon its outer surface, it is obvious that the sheet would have only isolated areas of luster, the portions of sheet formed by the internal portions of the adjoining rod sections being devoid of lustrous areas. In the case of a sheet formed in accordance with the present invention from rods or collapsed tubes of plastic having both external or internal zones or bands of luster, such bands become exposed and visible no matter along what portion the rod is cut. As a result, the sheet of Fig. 21 exhibits throughout practically the greater portion of its area, and in certain instances throughout its whole area, adjoining lustrous areas of considerable size, all such areas presenting a luster of variable and substantially uniformly graduated character, like mother-of-pearl, when viewed at different angles.

Especially where a screw feeder is employed, particles of black, aged or seasoned plastic of about 1/16 inch size may be added to the bath of plastic to produce a desirable speckled appearance. These particles should be preferably relatively hard so as not to diffuse into the main mass of plastic and may be of any desired color. These particles, by producing a wavy effect, improve the luster.

I have found that very satisfactory results can be obtained by employing a 000 aluminum bronze, about 510 grams being used for every 360 pounds of cotton, camphor and solvent, the solvent comprising somewhat less than one-fourth the total weight of material.

The plastic material employed in the present invention may be of various kinds, and although Celluloid is preferred, cellulose acetate plastics and other plastic material can also be used.

What I claim is:

1. In an extrusion press, the combination with the extrusion cylinder and ram thereof, of a dividing mechanism provided with a plurality of series of circular slots through which the plastic material is forced, an extrusion nozzle of a free cross-sectional area smaller than that of the dividing mechanism, a conduit between the dividing mechanism and the nozzle having a gradually diminishing free flow cross-sectional area from the dividing mechanism to the inlet of the nozzle, said nozzle comprising a bushing and a mandrel within said bushing and separated from said dividing mechanism, said mandrel being capable of being rocked within the bushing and means for rocking said mandrel relatively to the bushing.

2. An extrusion machine having a nozzle comprising a bushing and a mandrel positioned eccentrically in said bushing and means for rocking one of said elements relatively to the other to vary the eccentricity of the mandrel.

3. An extrusion nozzle comprising a bushing, a mandrel located therein, the cross-sectional contour of the mandrel being different from that of the bore of the bushing, said mandrel being positioned eccentrically with respect to the bushing and means for rocking one of said elements relatively to the other to vary the eccentricity of the mandrel.

4. In an apparatus for extruding plastic material having luster-producing particles therein, the combination with a pressure cylinder adapted to contain a mass of said material and means for forcing the mass from the cylinder, of mechanism for dividing material forced from the cylinder into a plurality of parts and orientating the particles in the respective parts, said mechanism comprising circularly arranged slots with the slots elongated circumferentially of the series, the walls of said slots constituting the particle-orientating surfaces, an extrusion nozzle spaced from said dividing mechanism, said nozzle comprising a bushing and a mandrel positioned within the bushing, said mandrel being supported from said dividing mechanism, and means for rocking the mandrel in its support, the cross-sectional flow area of the extrusion nozzle being less than that of said dividing means, and a consolidating conduit between the dividing means and the extrusion nozzle, the cross-sectional shape of said conduit being such as to impede the flow of material therethrough and to cause the increments of plastic material to curl therein as they emerge from said dividing means.

5. In an apparatus for extruding plastic material having luster-producing particles therein, the combination with a pressure cylinder adapted to contain a mass of said material and means for forcing the mass from the cylinder, of mechanism for dividing material forced from the cylinder into a plurality of parts and orientating the particles in the respective parts, an extrusion nozzle spaced from said dividing means, said nozzle comprising a fixedly mounted bushing, a mandrel positioned within said bushing in spaced relation thereto but tiltable relatively thereto, and means for tilting the mandrel relatively to the longitudinal axis of the bushing for positioning the mandrel and bushing eccentrically to each other, the cross-sectional flow area between said bushing and mandrel being less than that of said dividing means, and a consolidating conduit between said dividing means and said nozzle, the cross-sectional shape of said conduit being such as to impede the flow of material therethrough and cause the increments of plastic material to curl therein as they emerge from said dividing means.

CAMILLO ORSINI.